United States Patent [19]

Stolfi et al.

[11] Patent Number: 4,610,143

[45] Date of Patent: Sep. 9, 1986

[54] LONG LIFE VIBRATION CANCELLER HAVING A GAS SPRING

[75] Inventors: Fred R. Stolfi, Shrub Oak; Paul J. Shapiro, New York, both of N.Y.

[73] Assignee: North American Philips Corporation, New York, N.Y.

[21] Appl. No.: 682,877

[22] Filed: Dec. 18, 1984

[51] Int. Cl.⁴ ............................................. F25B 9/00
[52] U.S. Cl. .......................................... 62/6; 60/520
[58] Field of Search ............... 62/6; 60/517, 518, 519, 60/520

[56] References Cited

U.S. PATENT DOCUMENTS

| | | | |
|---|---|---|---|
| 3,991,586 | 11/1976 | Acord | 62/6 |
| 4,389,849 | 6/1983 | Gasser et al. | 62/6 |
| 4,417,448 | 11/1983 | Horn et al. | 62/6 |
| 4,483,425 | 11/1984 | Newman | 62/6 |

*Primary Examiner*—Ronald C. Capossela
*Attorney, Agent, or Firm*—Robert T. Mayer

[57] ABSTRACT

A vibration balancing arrangement utilizing a counterbalance mass oscillating at a frequency near its resonant frequency. Resonance is obtained by a gas spring, in which the length of the compression region for the gas is variable to vary the resonant frequency by adjusting the center point of the oscillation of the counterbalance mass.

18 Claims, 1 Drawing Figure

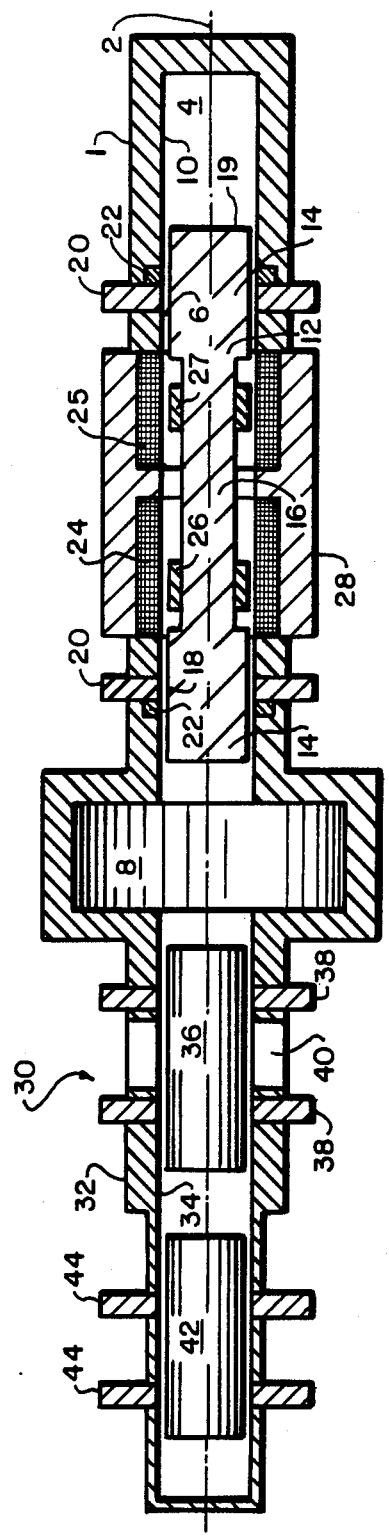

LONG LIFE VIBRATION CANCELLER HAVING A GAS SPRING

BACKGROUND OF THE INVENTION

1. Field of the Invention

In the field of precise instrumentation requiring auxiliary mechanical apparatus, the effects of vibration caused by operation of the auxiliary apparatus have been recognized as a serious problem for decades. The coupling of vibration from the apparatus frame to the instrument, or to a vehicle frame, has been the subject of much theoretical study and many experiments and developments. This work has been concentrated in two general areas: first, reduction of coupling of the vibratory movement of the apparatus to the instrument or the vehicle frame, through the use of vibration isolators or shock mounts; and secondly, cancellation of the effect of the vibration by causing an equal and opposite vibration to be applied either to the instrument or vehicle frame, or to be applied within the apparatus itself so that the apparatus frame has little or no vibration with respect to the instrument or the vehicle frame.

This invention relates particularly to the second type of device, which actually cancels the vibration or its effect.

A further problem which has been studied increasingly in recent decades has been the design of long life instrumentation, particularly for use where repair or other attention is virtually impossible, such as in unattended satellites. In these applications the results of wear of ordinary bearings, or even any rolling contact between metals, release microscopic particles which cause mechanical degradation of ultrasmooth surfaces or of small clearances, or other chemical-mechanical deterioration. To minimize these effects, contacts between elements which move with respect to each other, should be avoided wherever possible.

2. Description of the Prior Art

A first step in the reduction of vibration conducted to an instrument, vehicle frame, or other part of the environment has usually been to attempt to minimize the development of the initial vibration. Therefore every attempt is made to design mechanisms which are fully symmetrical, or are perfectly balanced with respect to rotational axes. Where the function of the machine requires the reciprocation of a mass such as a piston, the forces required to drive the piston couple an axial linear vibration into the machine frame. By the use of a linear drive motor coaxial with the piston, transverse vibrations can be eliminated.

If it is not convenient or possible to divide work between two pistons which are balanced and move in synchronization in opposite directions, the result is a linear vibration source that cannot be eliminated through improved manufacturing controls or improved design. This remaining vibration source must either be accepted at a level which is a function of the mass of the machine versus that of the vibrating piston, or cancelled for example by vibration absorption.

U.S. Pat. No. 4,483,425 discloses a system for attenuating or absorbing the vibration of a machine by vibration of a countermass which is also coupled to the machine frame. That system utilizes a feedback control system and an electrical linear drive motor to cause the piston to oscillate at a frequency and with a waveform which are predetermined or determined from some other sensing. In order to minimize reactive power flow to and from the linear motor, the preferred embodiment disclosed in this patent suggests the use of a spring which keeps the countermass centered about a fixed, approximately midstroke position. The spring-countermass combination can be tuned to the dominant vibration frequency, if the vibration to be cancelled has such a frequency.

When an attempt is made to construct such a machine like that in the '425 patent for use in a long life apparatus, the apparently simple problem of coupling the ends of the spring to the frame or the countermass turns out to be relatively complex. When a common helical spring is used to allow a fairly long linear stroke, movement of the last coil turn into and out of contact with the mount produces undesired non-linearities and also generates wear particles.

All the above expedients also suffer from the disadvantage that a mechanical spring and a mass have a single, fixed resonant frequency. Thus, good counterbalancing is only achieved if the vibration to be counteracted is at a given frequency or very close to that frequency. Small deviations can be handled by power supplied from an electrical or other motor coupled to the mass, but as soon as the frequency deviation becomes at all substantial, the power requirements become virtually as large as though there were no mechanical spring.

SUMMARY OF THE INVENTION

An object of the invention is to provide a counterbalance-type vibration canceller having a virtually unlimited operating life due to elimination of contact between any moving parts.

Another object of the invention is to provide a vibration canceller utilizing a spring-mass system whose resonant frequency can be adjusted over a wide range, without the application of substantial amounts of electrical power or reactive power through a motor.

In accordance with the invention a vibration balancing arrangement utilizes a counterbalance mass arranged in an elongated chamber or cylinder, having a gas compression region at one end of the cylinder, and a passageway which permits a controlled slow flow of gas to or from the compression region. To avoid the need for exertion of a continuous average force on the counterbalance mass, the average pressure to each side of the mass must be the same. Thus, the counterbalance mass will have a face, at an end opposite the compression region end, which is contacted by gas in a buffer region which usually has a volume much greater than that of the compression region. Pressure fluctuation in the buffer region due to oscillation of the mass will then be small compared to the pressure fluctuation in the compression region, which causes the spring effect.

Either of two constructions, and modes of operation, are possible according to the invention. First, the pressure in both the compression and buffer regions can be changed by adding or removing gas. This construction requires some type of valve arrangement, which is undesirable if maximum life without maintenance is possible, or connection to a source such as a temperature-controlled absorption medium. However, it does offer the advantage that the buffer region can be made small so that its pressure fluctuation provides a stiffer spring. Further, for some applications the resulting symmetrical non-linearity of force versus mass position may be desirable.

Secondly, in the preferred embodiment, the average volume of the compression region is changed without change of average pressure, so as to vary the spring constant. Preferably, a biasing force is applied to the mass to urge it in the desired direction toward or away from the compression region. Because of inherent leakages, or through a constricted passage provided for the purpose, a small net flow of gas will occur between the compression and buffer regions. As soon as the desired average volume change (average piston position) has been achieved, the biasing force is removed. Absent any net leakage past the counterbalance mass, the new resonant frequency will be maintained so long as a temperature change does not affect the average pressure in the compression region.

Of course, it is also possible to provide both modes of operation in one, more complex arrangement.

Still more preferably, the arrangement has a small clearance gap between the perimeter of the mass and the chamber or cylinder wall. With this arrangement the resonant frequency is readily varied by displacing the center position of the oscillating mass along the length of the chamber or cylinder, so as to vary the volume in the compression region.

In a preferred embodiment, the chamber has smooth cylindrical walls at least along a central region within which the counterbalance mass oscillates at resonant frequencies within the range of interest, the counterbalance mass has a cylindrical surface which is generally parallel to and coaxial with the cylindrical chamber wall, so as to define a small clearance space therebetween, the counterbalance mass is centered within the cylinder by a magnetic or hydrodynamic bearing effect, and a linear motor is provided for applying a biasing axial force to the mass in order to cause a net flow of gas through the clearance gap by displacing the average position of oscillation of the mass, thereby changing the resonant frequency.

Still more preferably, the chamber and mass have circular cross sections, the mass is suspended by an active magnetic bearing system, and a linear electric motor is used to provide the biasing force and to compensate for losses in the gas spring system. Where the vibration to be cancelled does not have a nonlinearity or harmonic content which is substantially equal to and opposed by that resulting from the slight nonlinearity of the gas spring, preferably the linear motor has a real and reactive power capacity sufficient to oscillate the countermass with a waveform which exactly counterbalances that of the vibration to be cancelled. To minimize undesired effects due to imperfect symmetry of the manufacturing operations, preferably the mass has symmetrical end portions on which the magnetic suspension acts, providing the greater portion of the total mass, while the central portion includes at least one radially magnetized permanent magnet which forms part of the linear drive motor.

The end of the counterbalance mass away from the compression region should face a buffer region, in which pressure fluctuations are not so severe or of incorrect phase that the spring effect is impaired.

According to another aspect of the invention, a thermodynamic machine having an axially driven piston within a cylinder, containing a mass of a working fluid or gas compressed or displaced by the piston to perform a thermodynamic cycle, is counterbalanced by a mass and gas spring as described above, in which one filling of gas occupies the space within a sealed case forming a continuous chamber, having a first portion in which the piston oscillates to perform the thermodynamic function and another portion communicating with the first portion in which the counterbalance mass oscillates. Preferably this construction permits one buffer region to provide buffering both for the thermodynamic piston and the counterbalance mass.

In a preferred embodiment of that aspect of the invention, the thermodynamic machine is a Stirling cycle refrigeration apparatus, having both a piston and a displacer oscillating coaxially with the counterbalance mass.

BRIEF DESCRIPTION OF THE DRAWING

The sole FIGURE is a partly diagrammatic longitudinal section of a Stirling cycle machine having a variable resonant frequency counterbalance in accordance with the invention.

DESCRIPTION OF THE PREFERRED EMBODIMENTS

The counterbalanced, Stirling cycle refrigerator machine, which is shown rather diagrammatically in the FIGURE, has a case 1 within which all the moving parts are hermetically sealed. Ideally, all of the significant parts are completely symmetrical about a longitudinal axis 2 of the machine, which is an axis of symmetry along which all motions take place.

The vibration balancing arrangement of the machine involves a compression region 4, a central region 6, and a buffer region 8 within the case 1. These regions are defined by a cylindrical wall 10 within which a counterbalance mass 12 is oscillated along the axis 2. The counterbalance mass 12 has two end portions 14 each having a cylindrical surface 18 which is parallel to and closely spaced from the cylindrical wall 10. The end portion 14 adjoining the compression region 4 has an end face 19 exposed to and contacted by a gas filling, such as helium, in the compression region.

The counterbalance mass 12 is radially positioned by a magnetic suspension system, which preferably is an active magnetic suspension system having electromagnets 20 and radial position sensors 22, which may be of any of the sorts well known in the art, that act on the cylindrical surfaces 18 of the end portions 14.

To position the counterbalance axially, and to provide compensating drive forces as may be desired, a pair of motor coils 24, 25 cooperate with radial magnets 26, 27 which form part of the central portion of the counterbalance mass. An axial position sensor (not shown) will preferably be used as part of the motor drive, for example as described in U.S. Pat. No. 4,483,425. The motor coils 24, 25 are shown as being surrounded by a soft magnetic return path 28, whose configuration is not material to the invention.

To the opposite side of the buffer region 8 from the counterbalance arrangement, a Stirling cycle refrigeration device 30 is shown very schematically. Such a device includes a cylinder 32 having an inner cylindrical wall 34 within which a piston 36 is provided, having a clearance seal between the piston and the cylinder wall 34. The piston is positioned radially by a magnetic suspension 38, and driven in an oscillating linear movement by a schematically shown linear motor 40. A displacer 42, of the type well known in the Stirling cycle art, is also positioned radially by a magnet suspension 44. It may be driven by the unbalanced gas pressures acting on the ends of the displacer, or by any conventional linear motor, not shown.

The operation of the vibration canceling arrangement may advantageously be very similar to that disclosed in U.S. Pat. No. 4,483,425, except for the added axial biasing function provided by the motor coils 24, 25. The symmetry of the device shown, when using a linear motor, may easily be designed so that there is a natural axial centering tendency caused by the motor. Thus, in that symmetrical center position, the volume of the compression region 4 will be of such size with respect to the mass of the counterbalance 12 and the pressure of a gas, such as helium, which fills the regions inside the case 1, that the natural resonant frequency of the mass-spring system formed by the counterbalance mass 12 and the gas spring formed by the compression region 4 will be the same as the normal or center-value operating frequency with which the Stirling refrigerator 30 is driven. Transducers, not shown, will sense either the relative movements of the piston 36 and displacer 42 with respect to the casing 1, or the vibration level being produced in the case 1, and provide driving current to the motor coils 24, 25 so as to excite relative movement of the counterbalance mass 12 to cancel those vibrations. Further, if the Stirling refrigerator 30 is being operated at a frequency different from the natural resonant frequency of the spring mass system, the invention makes correction possible by a circuit which is readily designed by those of ordinary skill in the art.

For example, when the counterbalance mass is being oscillated at its resonant frequency, the motor coils 24, 25 will provide only a real power portion necessary to compensate for harmonic or nonlinearity components of the vibration. If the resonant frequency is not the same as that of the Stirling machine operating frequency, vibration cancellation will require a reactive power component in the current through the motor coils. Detection of the reactive power component will then provide a correction signal which indicates whether the actual oscillating frequency is above or below the resonant frequency. If the resonant frequency is too low, then a small bias current will be passed through the motor coils 24, 25 to displace the average position of the counterbalance mass 12 toward the compression region 4, thereby raising the average spring constant of the gas spring and raising the resonant frequency until it matches that of the actual oscillating frequency. Similarly, if the counterbalance mass should be driven at a frequency below that corresponding to its average position, the control circuit will provide a bias current to displace the counterbalance mass 12 away from the compression region 4, thereby lowering the spring constant of the gas spring and lowering the resonant frequency to that at which the refrigerator is then operating.

If the motor and magnetic suspension have no strong axial centering tendency, then continuous axial bias power to maintain any particular resonant frequency is not required, except to overcome any slight pumping effect of the gas-moving mass system.

Those of ordinary skill in the machine design arts will recognize that a variable resonant frequency vibration canceller as defined in the following claims has many other useful forms and applications. For example, if the buffer region is not shared with another machine function, a controlled valve arrangement can be used to admit or remove gas to or from the buffer and compression regions, thereby changing the spring constant of the gas spring without change in the average countermass position.

Many other means of restraining the counterbalance mass to axial movement are possible. Low friction guide spacers may be placed between a cylinder wall and a countermass shaped as a piston, still utilizing a clearance seal between the counterbalance mass and the central region wall. Where long life is less important, manufacturing costs can be reduced through the use of greater tolerances and rougher machined surfaces, with any well known type of piston ring or sealing ring used between the counterbalance mass and the chamber central region. In such a variation, a leakage path such as a capillary passageway may be provided through the counterbalance mass, or around it through the casing, so as to communicate between the compression region and a buffer region.

When using a clearance seal, many alternative embodiments utilize the inventive concept advantageously. The counterbalance mass may be suspended on a shaft which has linear bearings of any well known sort. By appropriate shaping of the end faces of the counterbalance mass, for sufficiently high countermass velocities relative to the chamber wall a hydrodynamic centering film may be obtained, at the same time that centering is maintained adequately at the two ends of the stroke by the squeeze film effect as the counterbalance mass reverses direction.

Many other electromagnetic linear motor arrangements are possible, each of which offers its own advantages with respect to motor drive linearity, frequency response, or ease of fabrication while avoiding the exposure of organic material surfaces to the gas in the chamber itself. The various magnetic material portions may be made from low eddy current loss materials such as laminations or ferrites so long as adequate structural and gas-impermeable integrity is assured.

While in the preferred embodiment the case has been shown nominally as a single element, through whose wall various magnetic elements are fitted and sealed, it is clear that the structure must be one which is built up from sections that are fastened together, if only to permit placement of the moving parts on the interior. In an embodiment where the gas used for the gas spring does not communicate with other machine working spaces, the vibration balancing arrangement can be a separate unit which is fastened to the exterior of a machine, or to a vehicle frame to which the vibration source itself is fastened.

Finally, while there are manufacturing advantages in utilizing a single outside diameter for both ends of a counterbalance mass, it can also be provided with different portions having different outside diameters, oscillating within a case having stepped bores. While circular cross-sections are usually preferred for manufacturing ease, any other cross-section, having sufficient symmetry so as to avoid introducing unwanted vibration modes, may be used.

What is claimed:
1. A vibration balancing arrangement comprising:
 a chamber having a central region having an axis, and a compression region communicating with said central region,
 a gas filling which occupies the space at least within said compression region,
 a counterbalance mass disposed and axially movable within said central region, having an end face contacted by the gas filling in the compression region, arranged such that the gas in at least the compression region acts as a spring opposing oscillatory movement of the mass in the axial direction, and defines a resonant spring-mass system, and means for controllably admitting and removing gas to and from the compression region so as to change the gas spring constant, and thereby change the resonant frequency.

2. An arrangement as claimed in claim 1, characterized in that said means for admitting and removing gas to and from the compression region maintains average gas pressure unchanged in said compression region, whereby application of an axial biasing force to the counterbalance mass causes the central position of the mass, with respect to oscillatory movement, to be changed thereby changing the gas spring constant and the resonant frequency.

3. An arrangement as claimed in claim 2, characterized in that:

said chamber is an elongated chamber in which the central region is surrounded by a cylindrical wall coaxial with said axis, and the chamber further includes a buffer region, the buffer and compression regions communicating with respect opposite ends of said central region, said counterbalance mass has a cylindrical surface arranged to have a small clearance space between said surface and said cylindrical wall, said gas filling also occupies the space within said buffer region and clearance space, and said arrangement further comprises means for centering said mass about said axis, and means for applying a biasing force to said mass in either axial direction, whereby said clearance space forms said means for admitting and removing.

4. An arrangement as claimed in claim 3, characterized in that said means for applying is an electric linear motor also adapted to provide driving force to counterbalance vibration forces at frequencies substantially different from the resonant frequency of the mass and gas spring.

5. An arrangement as claimed in claim 3, characterized in that said means for centering comprises a magnetic suspension system.

6. An arrangement as claimed in claim 5, characterized in that said magnetic suspension system acts directly on said mass.

7. An arrangement as claimed in claim 6, characterized in that said mass is divided into two symmetrical end portions and a central portion, the end portions having a total mass greater than the central portion, the magnetic suspension acting on said end portions.

8. An arrangement as claimed in claim 7, characterized in that said mass central portion comprises at least one radially magnetized permanent magnet, and said end portions are soft magnetic material.

9. A linearly driven, counterbalanced machine comprising a cylinder enclosing at least a portion of a space, a piston arranged to be driven linearly within said cylinder to perform a thermodynamic function, means for driving said piston linearly at a given frequency which is variable over a range, an elongated chamber arranged coaxially with and rigidly connected to said cylinder, having a central region surrounded by a cylindrical wall coaxial with said axis, a buffer region and a compression region communicating with respective opposite ends of said central region, a counterbalance mass disposed within said central region, having a cylindrical surface arranged to have a small clearance space between said surface and said cylindrical wall, means for centering said mass about said axis, means for applying a biasing axial force to said mass in either axial direction, and a gas filling which occupies the space within said buffer region, compression region and clearance space; the mass of the counterbalance, the volume of the compression region and the gas pressure being selected such that the gas in at least the compression region acts as a spring opposing oscillatory movement of the counterbalance mass in the axial direction, and defines a spring-mass system resonant at substantially said given frequency, whereby the resonant frequency of the counterbalance system is changeable over said range upon application of a biasing force by said means for applying, said application of a biasing force causing the central position of the mass with respect to oscillatory movement to be changed as a result of net gas flow through the clearance space to or from the compression space.

10. A machine as claimed in claim 9, characterized in that said means for applying comprises a linear electric motor which provides both said biasing axial force and a driving force for counterbalancing vibration forces at frequencies substantially different from said given frequency.

11. A machine as claimed in claim 9, characterized in that said elongated chamber and said cylinder communicate with each other and enclose one space of which said regions are portions, the average pressure of said gas filling being the same throughout said space.

12. A machine as claimed in claim 11, characterized in that said piston has a cylindrical surface arranged to have a small clearance between the piston and the cylinder, forming a clearance seal between a thermodynamic work space in the cylinder and said buffer region, whereby one buffer region buffers both the piston and counterbalance movement effects.

13. A machine as claimed in claim 12, characterized in that said means for applying comprises a linear electric motor which provides both said biasing axial force and a driving force for counterbalancing vibration forces at frequencies substantially different from said given frequency.

14. A hermetically sealed Stirling cycle refrigeration machine, comprising a hermetically sealed case enclosing a space, at least a portion of the space being a cylinder having an axis, a piston movable axially within said cylinder, means for driving said piston linearly at a given frequency which is variable over a range, a displacer arranged to be movable linearly within said space in cooperation with said piston to perform a refrigerating thermodynamic function, an elongated chamber arranged coaxially with and rigidly connected to said cylinder, having a central region surrounded by a cylindrical wall coaxial with said axis, and a buffer region and a compression region communicating with respective opposite ends of said central region, a counterbalance mass disposed within said central region, having a cylindrical surface arranged to have a small clearance space between said surface and said cylindrical wall, means for centering said mass about said axis, means for applying a biasing axial force to said mass in either axial direction, and a gas filling which occupies the space within said buffer region, compression region and clearance space; the mass of the counterbalance, the volume of the compression region and the gas pressure being selected such that the gas in at least the compression region acts as a spring opposing oscillatory movement of the counterbalance mass in the axial direction, and defines a spring-mass system resonant at substantially said given frequency, whereby the resonant frequency of the counterbalance system is changeable over said range upon application of a biasing force by said means for applying, said application of a biasing force causing the central position of the mass with respect to oscillatory movement to be changed as a result of net gas flow through the clearance space to or from the compression space.

15. A machine as claimed in claim 14, characterized in that said means for applying comprises a linear electric motor which provides both said biasing axial force and a driving force for counterbalancing vibration forces at frequencies substantially different from said given frequency.

16. A machine as claimed in claim 14, characterized in that said elongated chamber and said cylinder communicate with each other and enclose one space of which said regions are portions, the average pressure of said gas filling being the same throughout said space.

17. A machine as claimed in claim 16, characterized in that said piston has a cylindrical surface arranged to have a small clearance between the piston and the cylinder, forming a clearance seal between a thermodynamic work space in the cylinder and said buffer region, whereby one buffer region buffers both the piston and counterbalance movement effects.

18. A machine as claimed in claim 17, characterized in that said means for applying comprises a linear electric motor which provides both said biasing axial force and a driving force for counterbalancing vibration forces at frequencies substantially different from said given frequency.

* * * * *